(12) United States Patent
Maaref et al.

(10) Patent No.: US 12,726,871 B2
(45) Date of Patent: Sep. 1, 2026

(54) SYSTEM AND METHOD FOR MOBILITY MANAGEMENT IN WIRELESS NETWORKS

(71) Applicant: HUAWEI TECHNOLOGIES CO., LTD., Shenzhen (CN)

(72) Inventors: Amine Maaref, Kanata (CA); Aman Jassal, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/494,725

(22) Filed: Oct. 25, 2023

(65) Prior Publication Data

US 2024/0056925 A1 Feb. 15, 2024

Related U.S. Application Data

(63) Continuation of application No. PCT/CN2021/090779, filed on Apr. 28, 2021.

(51) Int. Cl.
*H04W 36/08* (2009.01)
*H04W 36/00* (2009.01)

(52) U.S. Cl.
CPC ..... *H04W 36/083* (2023.05); *H04W 36/0022* (2013.01); *H04W 36/0055* (2013.01)

(58) Field of Classification Search
CPC ........... H04W 36/083; H04W 36/0022; H04W 36/0055
See application file for complete search history.

(56) References Cited

U.S. PATENT DOCUMENTS 10,805,850 B1 * 10/2020 Benammar ......... H04W 36/144
11,546,943 B2 * 1/2023 Liang ................ H04W 74/0833
(Continued)

FOREIGN PATENT DOCUMENTS

CN 112437471 A 3/2021
WO 2019193891 A1 10/2019
(Continued)

OTHER PUBLICATIONS

Ericsson: "Observations on Xn Usage for Transparent NTN", 3GPP Draft; R3-206406, 3rd Generation Partnership Project (3GPP), Mobile Competence Centre; 650, Route Deslucioles; F-06921 Sophia-Antipolis Cedex; France, vol. RAN WG3, No. Online; Nov. 2, 2020-Nov. 12, 2020 Oct. 22, 2020 (Oct. 22, 2020), XP051941751, total 3 pages.

3GPP TSG-RAN WG2 Meeting #108, R2-1915192,"Service continuity between TN and NTN", Huawei, HiSilicon, Nov. 18-22, 2019, XP051817077, total 5 pages.

(Continued)

*Primary Examiner* — Hunter B Lonsberry
(74) *Attorney, Agent, or Firm* — Slater Matsil, LLP

(57) ABSTRACT

Some embodiments of the present disclosure relate to mobility management across multiple subsystems of wireless network devices, such as base-stations, drones, balloons, planes and satellites. In particular, the maintenance of user experiences across the subsystems is addressed. Aspects of the present disclosure relate to integrating terrestrial networks with non-terrestrial networks and establishing mechanisms for managing mobility of user devices as the devices travel from a service area defined by a connection with a terrestrial network to a service area defined by a connection with a non-terrestrial network or vice versa. Aspects of the present disclosure relate to establishing a format for an exchange of communication between user devices and transmit-receive points so that the mobility of the user device may be appropriately managed.

24 Claims, 12 Drawing Sheets

(56) References Cited

U.S. PATENT DOCUMENTS

| | | | | |
|---|---|---|---|---|
| 2016/0323800 | A1* | 11/2016 | Ulupinar | H04B 7/1851 |
| 2021/0105693 | A1* | 4/2021 | Tripathi | H04W 84/06 |
| 2021/0119861 | A1 | 4/2021 | Tripathi et al. | |
| 2021/0211328 | A1* | 7/2021 | Xu | H04L 5/0048 |
| 2022/0232465 | A1 | 7/2022 | Tsuda | |

FOREIGN PATENT DOCUMENTS

| | | | |
|---|---|---|---|
| WO | 2020221014 | A1 | 11/2020 |
| WO | 2020230511 | A1 | 11/2020 |
| WO | 2021063726 | A1 | 4/2021 |

OTHER PUBLICATIONS

Nokia et al., "3GPP TSG-RAN WG2 Meeting #113", R2-2100527, Report from [Post112-e][153][NTN] Idle mode aspects (Nokia), Feb. 5, 2021 (Feb. 5, 2021), 27 pages.

3GPP TR 38.802 V14.2.0, 3rd Generation Partnership Project; Technical Specification Group Radio Access Network, Study on New Radio Access Technology Physical Layer Aspects, (Release 14), Sep. 2017, 145 pages.

3GPP TSG RAN meeting #86, "Solutions for NR to support non-terrestrial networks (NTN)", RP-193234, Sitges, Spain, Dec. 9-13, 2019, 10 pages.

3GPP TS 38.331 V16.4.1 (Mar. 2021), 3rd Generation Partnership Project; Technical Specification Group Radio Access Network;NR-;Radio Resource Control (RRC) protocol specification(Release 16), 949 pages.

* cited by examiner

Figure 4:
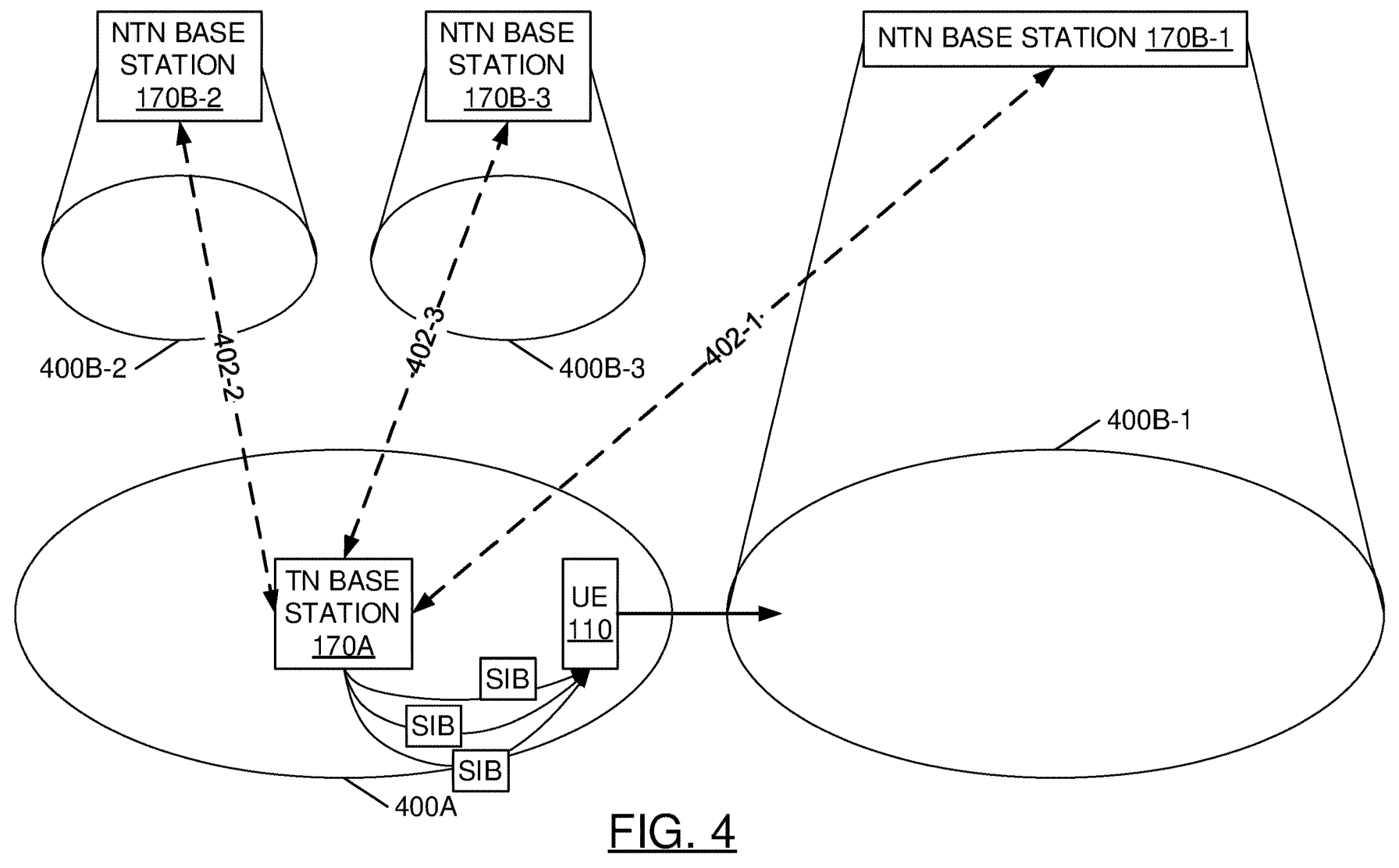

NTN BASE STATION 170B-1

400B-1

402-1

NTN BASE STATION 170B-3

400B-3

402-3

NTN BASE STATION 170B-2

400B-2

402-2

UE 110

SIB

SIB

SIB

TN BASE STATION 170A

TN BASE STATION 170A
UE 110
NTN BASE STATION 170B-1
NTN BASE STATION 170B-2
NTN BASE STATION 170B-3
SW. REQ.
SW. REQ.
SW. REQ.
SW. REQ. ACK
SW. REQ. ACK
SW. REQ. ACK
CCS
SELECT PRACH
PRACH
PRACH
PRACH
RAR
RAR
RAR
SELECT BS
UE ID
CRM
ACK
502
504
506
508
510
512
514
516
518
520
522

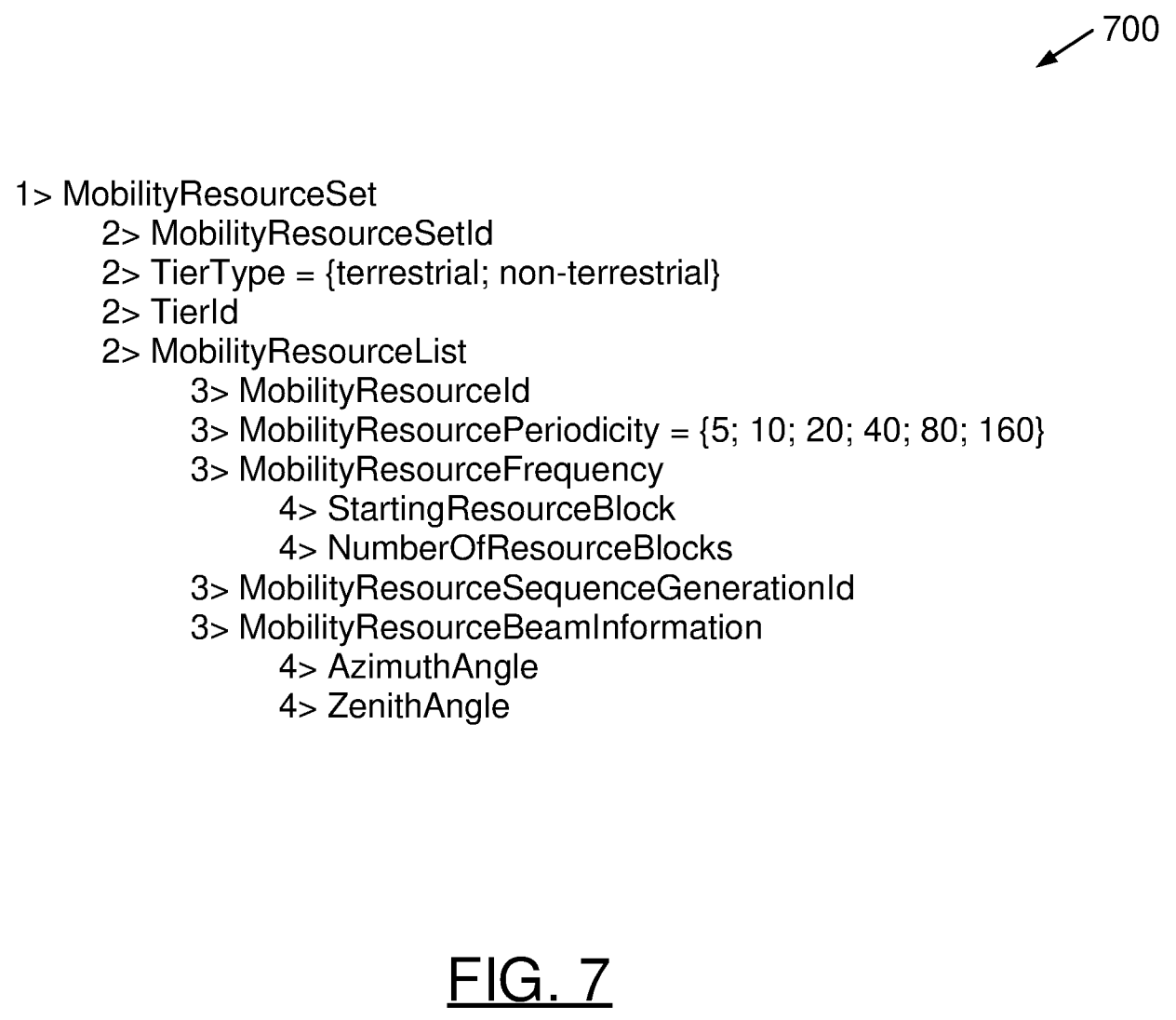

700

1> MobilityResourceSet
2> MobilityResourceSetId
2> TierType = {terrestrial; non-terrestrial}
2> TierId
2> MobilityResourceList
3> MobilityResourceId
3> MobilityResourcePeriodicity = {5; 10; 20; 40; 80; 160}
3> MobilityResourceFrequency
4> StartingResourceBlock
4> NumberOfResourceBlocks
3> MobilityResourceSequenceGenerationId
3> MobilityResourceBeamInformation
4> AzimuthAngle
4> ZenithAngle

FIG. 7

NTN BASE STATION 170B

NOTIFICATION 804

800B

UE 110

SIB1 810

CD-SSB 806

TN BASE STATION 170A

SYSTEM AND METHOD FOR MOBILITY MANAGEMENT IN WIRELESS NETWORKS

CROSS REFERENCE TO RELATED APPLICATIONS

This application is a continuation of International Patent Application No. PCT/CN2021/090779, filed Apr. 28, 2021, entitled "SYSTEM AND METHOD FOR MOBILITY MANAGEMENT IN WIRELESS NETWORKS", the contents of which are incorporated by reference herein its entirety.

TECHNICAL FIELD

The present disclosure relates generally to systems wherein terrestrial radio access networks and non-terrestrial radio access networks are integrated and, in particular embodiments, to mobility management in such integrated systems.

BACKGROUND

As discussed herein, a reference to terrestrial radio access networks is a reference to the familiar cellular telephone and data networks. In contrast, a reference to non-terrestrial radio access networks is a reference to networks, or segments of networks, using an airborne vehicle or a spaceborne vehicle for signal transmission and reception.

Examples of spaceborne vehicles used for non-terrestrial radio access networks include: Low Earth Orbiting (LEO) satellites; Medium Earth Orbiting (MEO) satellites; Geostationary Earth Orbiting (GEO) satellites; and Highly Elliptical Orbiting (HEO) satellites. Examples of airborne vehicles used for non-terrestrial radio access networks include High Altitude Platforms (HAPs) such as Unmanned Aircraft Systems (UAS) including Lighter than Air (LTA) UAS and Heavier than Air (HTA) UAS. These platforms typically operate at altitudes between 8 km and 50 km and are considered to be quasi-stationary.

Terrestrial networks (TNs) are known to employ airborne transmit and receive points (TRPs). Airborne TRPs are typically deployed at around 100 m aboard drone-type vehicles. Airborne TRPs may be considered part of a TN or non-terrestrial network (NTN) depending on whether the airborne TRP connects to a terrestrial core network using a wireless backhaul directly through the TN or indirectly through the NTN.

There is a desire for improved methods for user devices to connect to TNs and NTNs, in particular for handover events between a TN and an NTN.

SUMMARY

Aspects of the present application relate to integrating terrestrial networks with non-terrestrial networks and establishing mechanisms for managing mobility of user devices as the devices travel from a service area defined by a connection with a terrestrial network to a service area defined by a connection with a non-terrestrial network or vice versa. Aspects of the present application relate to establishing a format for an exchange of communication between user devices and TRPs so that the mobility of the user device may be appropriately managed.

In aspects of the present application, user devices can be transferred from one network to another network in an apparently seamless manner, wherein the user experience appears interruption-free.

When subsystem mobility is controlled by a base station in one network, as in aspects of the present application, the base station in the one network controls to which other base station, in another network, the user device is potentially handed over. Accordingly, the user device need not waste time and/or processing power detecting radio links and measuring the strength of the detected radio links.

Aspects of the present application approach mobility management in integrated terrestrial networks (TNs) and non-terrestrial (NTNs) networks by providing a framework wherein a base station (NTN or TN) can facilitate transferring a user device that is in the RRC_CONNECTED state from NTN to TN or TN to NTN, while reducing handover delays. From the perspective of the user device, beam sweeping efforts in beam-based communications are also reduced, because the user device does not have to detect synchronization signal blocks from TN base stations. Indeed, in one example case, the user device can rely on information received from the NTN base station to directly beamform preamble transmissions in the direction of the TN base station.

The user device may also be shown to experience smooth cross-subsystem mobility when in RRC_IDLE/INACTIVE state and being transferred from the terrestrial subsystem to the non-terrestrial subsystem or from the non-terrestrial subsystem to the terrestrial subsystem. Because, in the first instance, the terrestrial subsystem base station communicates with the non-terrestrial subsystem base stations to which the user device may, potentially, be switched, the user device need not waste time or processing power detecting and measuring radio links from base stations in subsystems that are not of interest.

According to an aspect of the present disclosure, there is provided a method of managing a user equipment mobility in a radio access network. The method includes communicating, from a first device, a message to a second device, wherein one of the first device and the second device is a non-terrestrial device and the other of the first device and the second device is a terrestrial device and providing, to the user equipment, configuration parameters related to access, by the user equipment, to the second device.

According to another aspect of the present disclosure, there is provided a first device. The device includes a memory storing instructions, a receiver, a transmitter and a processor. The processor is configured, by executing the instructions, to use the transmitter to transmit a message to a second device, wherein one of the first device and the second device is a non-terrestrial device and the other of the first device and the second device is a terrestrial device, and use the transmitter to provide, to the user equipment, configuration parameters related to access, by the user equipment, to the second device.

According to a further aspect of the present disclosure, there is provided a method for a user equipment in a radio access network. The method includes receiving, from a first device, a notification, the notification activating, at the user equipment, a cell reselection or initial cell selection procedure, detecting, during the cell reselection or initial cell selection procedure, a cell-defining synchronization signal block from a second device, wherein one of the first device and the second device is a non-terrestrial device and the other of the first device and the second device is a terrestrial device, and receiving, from the second device, a system information message.

According to another aspect of the present disclosure, there is provided a user equipment in a radio access network. The user equipment includes a memory storing instructions and a processor. The processor is configured, by executing the instructions, to receive, from a first device, a notification, the notification activating, at the user equipment, a cell reselection or initial cell selection procedure, detect, during the cell reselection or initial cell selection procedure, a cell-defining synchronization signal block from a second device, wherein one of the first device and the second device is a non-terrestrial device and the other of the first device and the second device is a terrestrial device, and receive, from the second device, a system information message.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 4 illustrates an environment with a terrestrial network base station defining terrestrial network coverage and multiple non-terrestrial network base stations defining non-terrestrial network coverage, with the example user equipment of FIG. 2 moving out of terrestrial network coverage and into non-terrestrial network coverage, according to aspects of the present disclosure;

FIG. 7 illustrates an example of a mobility resource configuration provided by higher-layer signaling, according to aspects of the present disclosure;

FIG. 8 illustrates an environment with a terrestrial network base station defining terrestrial network coverage and a non-terrestrial network base station defining non-terrestrial network coverage, with the example user equipment of FIG. 2 moving out of non-terrestrial network coverage and into terrestrial network coverage, according to aspects of the present disclosure;

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
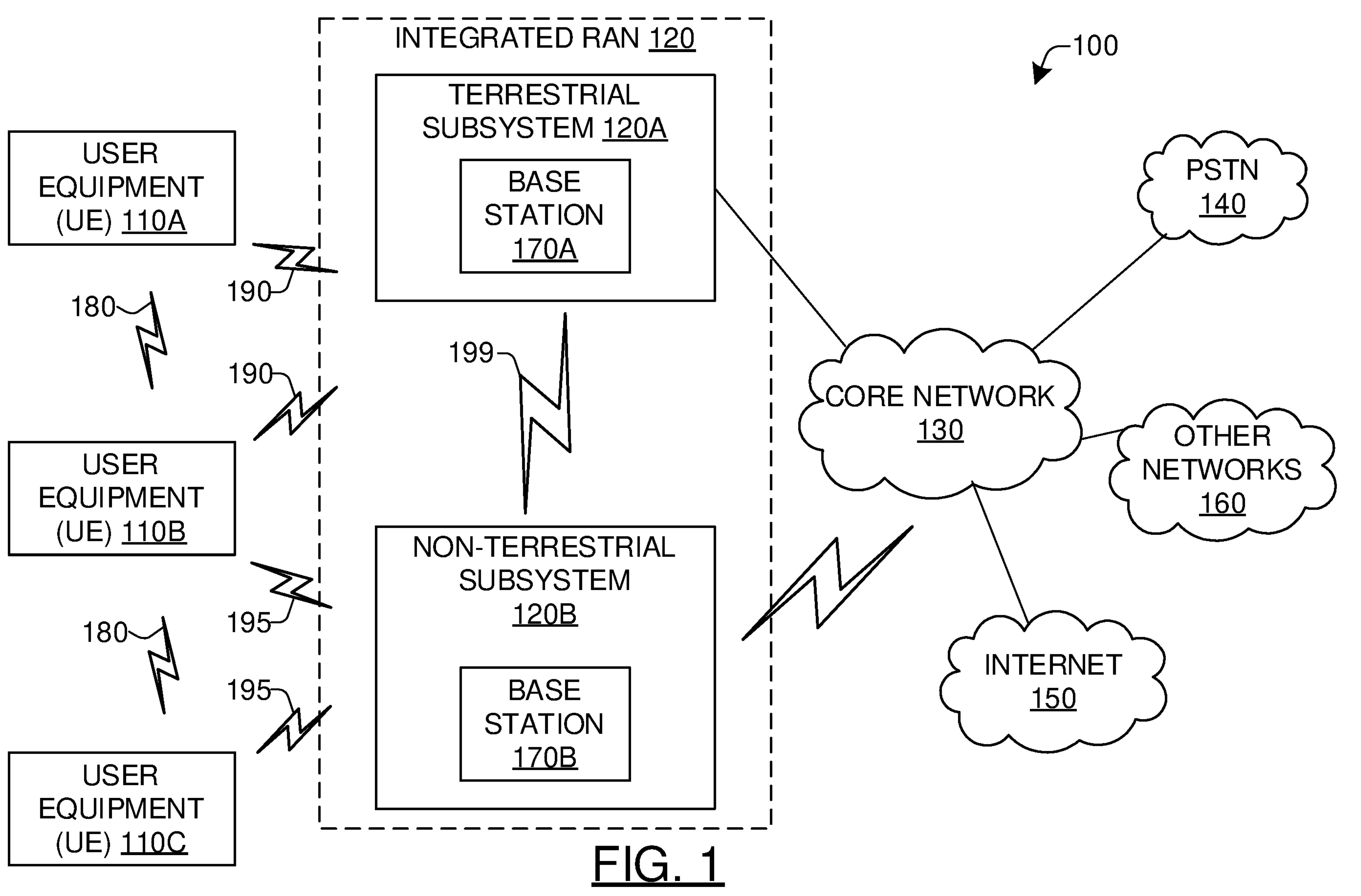
FIG. 1 is a schematic diagram of a communication system in which embodiments of the disclosure may occur, the communication system includes an example user equipment and an example base station.

FIG. 1 illustrates, in a schematic diagram, an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), an integrated terrestrial and non-terrestrial radio access network (RAN) 120, a core network 130, a public switched telephone network (PSTN) 140, the Internet 150 and other networks 160. The integrated RAN 120 includes a terrestrial subsystem 120A and a non-terrestrial subsystem 120B. Although certain numbers of these components or elements are shown in FIG. 1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the terrestrial subsystem 120A includes a terrestrial base station 170A and the non-terrestrial subsystem 120B includes a non-terrestrial base station 170B (the base stations may be referenced individually or collectively by reference numeral 170). The base station 170 may also be called an anchor or a transmit point (TP). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB, "eNB"), a Home eNodeB, a gNodeB ("gNB"), a transmission and receive point (TRP), a site controller, an access point (AP) or a wireless router. Any UE 110 may alternatively or additionally be configured to interface, access or communicate with any other base station 170, the internet 150, the core network 130, the PSTN 140, the other networks 160 or any combination of the preceding.

The UEs 110 and the base stations 170 are examples of communication equipment that can be configured to implement some or all of the functionality and/or embodiments described herein. In the embodiment shown in FIG. 1, the terrestrial base station 170A forms part of the terrestrial subsystem 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding subsystem, or otherwise. Also, the non-terrestrial base station 170B forms part of the non-terrestrial subsystem 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of subsystems shown is exemplary only. Any number of subsystems may be contemplated when devising the integrated RAN 120 and the communication system 100, in general.

The terrestrial BS 170A communicates with one or more of the UEs 110 over one or more terrestrial air interfaces 190 using wireless communication links, e.g., radio frequency (RF) wireless communication links, microwave wireless communication links, infrared (IR) wireless communication links, visible light (VL) communications links, etc. The non-terrestrial BS 170B communicates with one or more of the UEs 110 over one or more non-terrestrial air interfaces 195 using wireless communication links. The air interfaces 190/195 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), space division multiple access (SDMA), orthogonal FDMA (OFDMA) or single-carrier FDMA (SC-FDMA) in the air interfaces 190/195.

A base station 170 may implement Universal Mobile Telecommunication System (UMTS) Terrestrial Radio Access (UTRA) to establish the air interface 190 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 190 with Evolved UTMS Terrestrial Radio Access (E-UTRA) using 4G Long-Term Evolution (LTE), LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE and GERAN. Of course, other multiple access schemes and wireless protocols may be utilized.

The subsystems of the integrated RAN 120 are in communication with the core network 130 to provide the UEs 110 with various services such as voice communication services, data communication services and other communication services. The subsystems and/or the core network 130 may be in direct or indirect communication with one or more other subsystems (not shown), which may or may not be directly served by the core network 130 and may or may not employ the same radio access technology as the terrestrial subsystem 120A, the non-terrestrial subsystem 120B or both. The core network 130 may also serve as a gateway access between (i) the subsystems or the UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the UEs 110 communicate with one or more of the base stations 170 or they may be substantially different. For example, the communication system 100 may implement one or more channel access methods, such as CDMA, TDMA, FDMA, SDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

Figure 2:
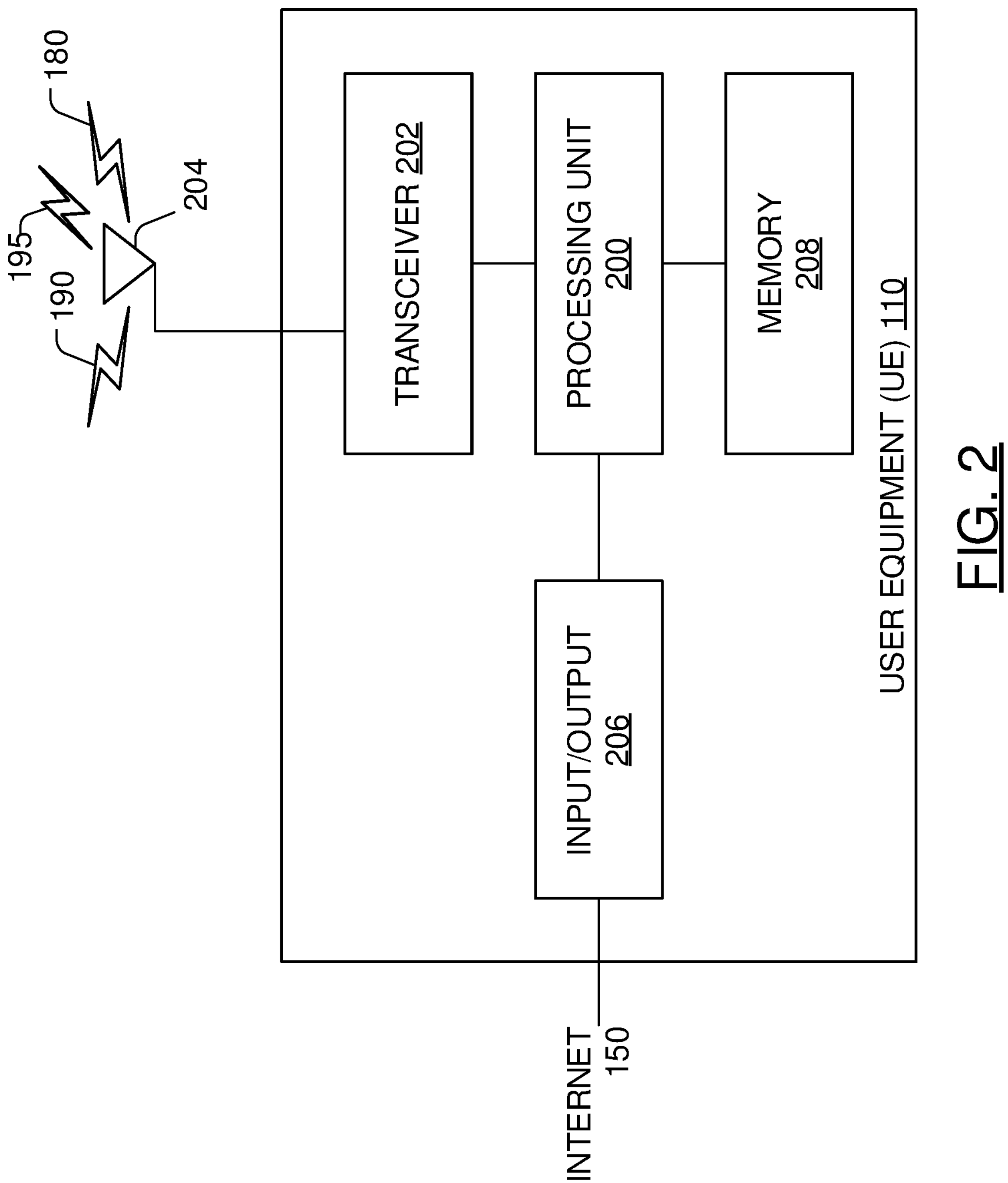
FIG. 2 illustrates, as a block diagram, the example user equipment of FIG. 1, according to aspects of the present disclosure.
Figure 3:
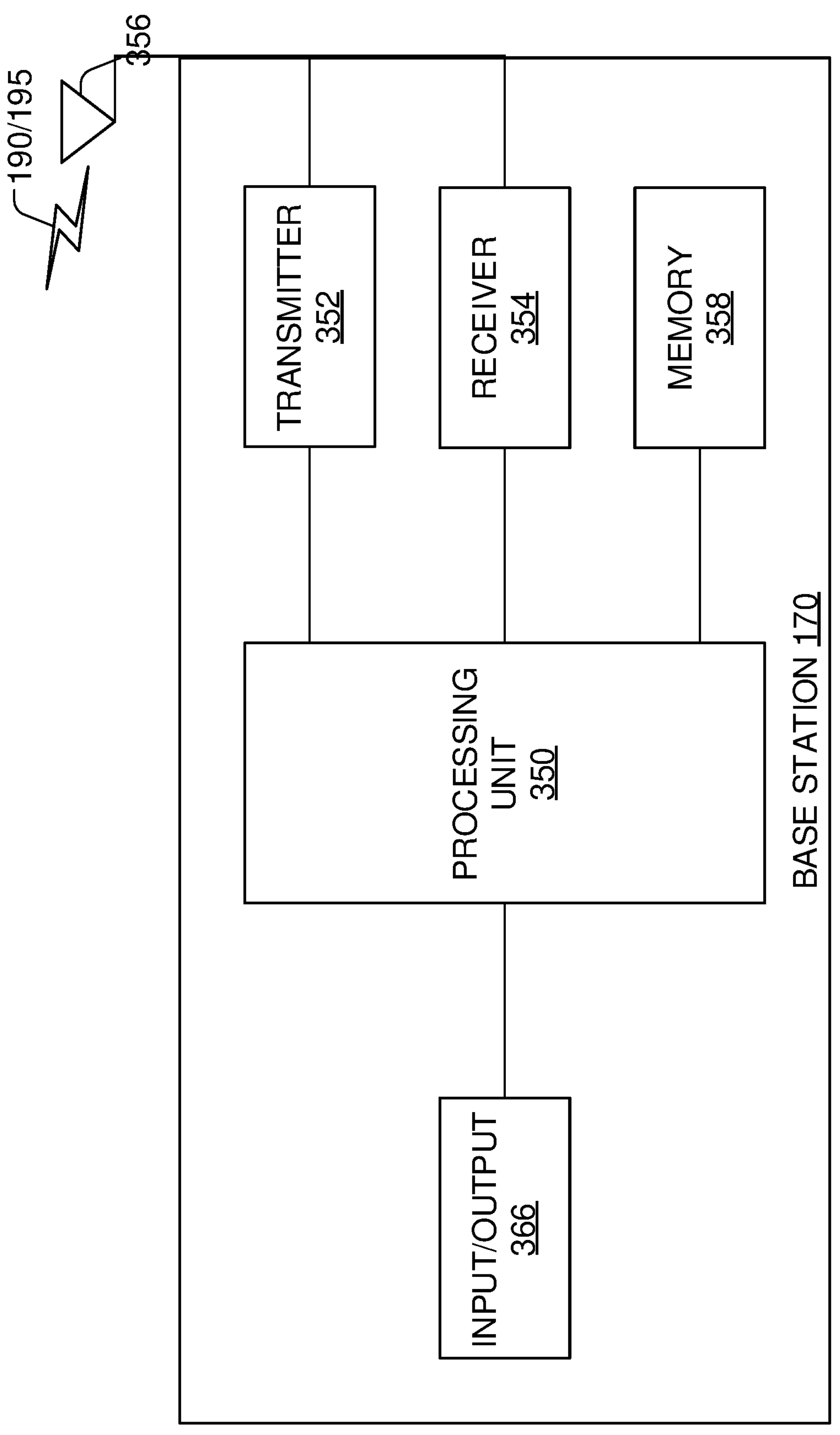
FIG. 3 illustrates, as a block diagram, the example base station of FIG. 1, according to aspects of the present disclosure.

FIGS. 2 and 3 illustrate example devices that may implement the methods and teachings according to this disclosure. In particular, FIG. 2 illustrates an example UE 110 and FIG. 3 illustrates an example base station 170. These components could be used in the communication system 100 of FIG. 1 or in any other suitable system.

As shown in FIG. 2, the UE 110 includes at least one UE processing unit 200. The UE processing unit 200 implements various processing operations of the UE 110. For example, the UE processing unit 200 could perform signal coding, data processing, power control, input/output processing, or any other functionality enabling the UE 110 to operate in the communication system 100. The UE processing unit 200 may also be configured to implement some or all of the functionality and/or embodiments described in more detail above. Each UE processing unit 200 includes any suitable processing or computing device configured to perform one or more operations. Each UE processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the ED 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one UE memory 208. The UE memory 208 stores instructions and data used, generated, or collected by the ED 110. For example, the UE memory 208 could store software instructions or modules configured to implement some or all of the functionality and/or embodiments described above and that are executed by the UE processing unit(s) 200. Each UE memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one BS processing unit 350, at least one transmitter 352, at least one receiver 354, one or more antennas 356, at least one memory 358, and one or more input/output devices or interfaces 366. A transceiver, not shown, may be used instead of the transmitter 352 and receiver 354. The BS processing unit 350 implements various processing operations of the base station 170, such as signal coding, data processing, power control, input/output processing, or any other functionality. The BS processing unit 350 can also be configured to implement some or all of the functionality and/or embodiments described in more detail above. Each BS processing unit 350 includes any suitable processing or computing device configured to perform one or more operations. Each BS processing unit 350 could, for example, include a microprocessor, microcontroller, digital signal processor, field programmable gate array, or application specific integrated circuit.

Each transmitter 352 includes any suitable structure for generating signals for wireless or wired transmission to one or more UEs or other devices. Each receiver 354 includes any suitable structure for processing signals received wirelessly or by wire from one or more UEs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the UE 110. The memory 358 stores instructions and data used, generated, or collected by the base station 170. For example, the memory 358 could store software instructions or modules configured to implement some or all of the functionality and/or embodiments described above and that are executed by the BS processing unit(s) 350.

Each input/output device 366 permits interaction with a user or other devices in the network. Each input/output device 366 includes any suitable structure for providing information to or receiving/providing information from a user, including network interface communications.

It is known that when terrestrial networks (TNs) are integrated with non-terrestrial networks (NTNs) the result can be that the coverage available to a mobile device is extended beyond the coverage available using only a terrestrial (cellular) network. Furthermore, service quality to the mobile device may be enhanced through the use of an integrated TN and NTN system. It is envisioned that an integrated TN and NTN system will use a TN to offer a primary service and use an NTN to provide a secondary service. Airborne TRPs may allow for a regional service boost on-demand. It may be considered that joint operation of a TN and a NTN in an integrated system comprising TN components and NTN components will enable a three-dimensional wireless communication system.

In a given integrated TN and NTN system, there exist many use case scenarios that call for so-called "multi-connectivity" between the TN and the NTN. A big-event scenario may call for on-demand ad hoc facilities in under-served areas. An urban and sub-urban scenario may be defined by TN coverage that overlaps with NTN coverage. A public transportation scenario may be defined by passengers on board a vehicle (e.g., a high-speed train, a regular train, a bus, a river boat) who may benefit from NTN connectivity in conjunction with TN connectivity.

The roles and benefits of satellites in 5G (fifth generation) mobile (terrestrial) networks have been studied by the 3rd Generation Partnership Project (3GPP). 5G New Radio (NR) is a radio access technology (RAT) developed by the 3GPP for 5G mobile networks. The studies by the 3GPP has led to specific requirements to support satellite access being captured in a technical specification, TS22.261—"Service requirements for next generation new services and markets; Stage 1." The technical specification recognizes the added value that satellite coverage brings, as part of the mix of access technologies for 5G.

The 3GPP has also released study and work items dedicated to NTNs. These study and work items investigate and specify solutions enabling 5G NR to support non-terrestrial networks. Notably, in these study and work items, terrestrial and non-terrestrial networks are considered separately. That is, TN systems and NTN systems are deployed independently and a given user equipment (UE) is either connected to a TN system or connected to a NTN system, but not connected to both.

In contrast, some aspects of the present application consider an integrated TN and NTN system, where TN subsystems and NTN subsystems are parts of an overall wireless network system and a given UE, registered to the overall wireless network system, can establish a connection to one subsystem or to both subsystems.

In the context of an overall wireless network system, some aspects of the present application address jointly operating a cross-subsystem handover for different use case scenarios. Various factors are considered, including UE mobility, UE location, UE trajectory, UE connection state and power saving.

In 5G NR, a UE 110 may operate in one of the following three radio resource control (RRC) states: an RRC_IDLE state; an RRC_CONNECTED state; and an RRC_INACTIVE state. In other documentation, these states may be referenced as "modes", for example, "RRC_IDLE mode." When the UE 110 is in the RRC_CONNECTED state, the UE 110 may be considered to have been connected to a BS 170 as a result of a connection establishment procedure. When the UE 110 has transitioned to the RRC_IDLE state, say, by way of a release procedure, the UE 110 is not connected to the BS 170, but the BS 170 knows that the UE 110 is present in the network. By switching to the RRC_INACTIVE state, for example, by way of a release with suspend procedure, the UE 110 helps save network resources and UE power (thereby lengthening, for example, perceived UE battery life). The RRC_INACTIVE state is known to be useful, for example, in those instances when the UE 110 is not communicating with the BS 170. When the UE 110 is in the RRC_INACTIVE state, the BS 170 and the UE 110 both store at least some configuration information to, thereby, allow the UE 110 to reconnect to the BS 170, by way of a resume procedure, more rapidly than the UE 110 would be able to reconnect, by way of the connection establishment procedure, in the case wherein the UE 110 is in the RRC_IDLE state. The storage of at least some configuration information when the UE 110 is in the RRC_INACTIVE state is one aspect that distinguishes the RRC_INACTIVE state from the RRC_IDLE state.

Current mobility management procedures in cellular networks are based on measurements, made at mobile devices, of reference signals sent by serving and non-serving base stations. Furthermore, a mobility reporting framework is premised around cell-based events. An example of such a cell-based event is an event wherein a measured strength of a first reference signal from a first base station becomes greater than a measured strength of a second reference signal from a second base station. Such cell-based events are typically based on reference signal received power (RSRP) measurements, with the premise that one of the features of a link between a base station and a mobile device is that only one end of the link is mobile.

In 5G NR, a given UE 110 is expected to perform measurements on synchronization signal blocks (SSBs) and/or Physical Broadcast Channel (PBCH) blocks from serving and non-serving base stations 170 at all times. The given UE 110 can, optionally, be configured to perform measurements on a channel state information reference signal (CSI-RS). The performance of these measurements may be shown to result in a behavior where the UE 110 always has to detect and measure signals such as blocks transmitted by non-serving/neighbor base stations 170. Detecting and measuring such blocks may be considered both time-consuming and power-consuming. Current mobility solutions have been configured to address a problem known as the "ping-pong effect" wherein a UE 110 at the border of two cells can bounce between being served by the base stations 170 that define the two cells.

In overview, aspects of the present application relate to mobility management of UEs 110 across multiple subsystems of wireless network devices, such as base-stations, drones, balloons, planes and satellites. In particular, some aspects of the present application address the maintenance of user experiences across the subsystems. In the context of the present application and as illustrated in FIG. 1, "subsystem" refers to a part of a single, integrated terrestrial and non-terrestrial RAN. Although the term subsystem is used in the present application, other terms can be used equally, such as tier, layer, etc.

Some aspects of the present application relate to a UE 110 switching between a connection to a BS 170 in one subsystem to a connection to a BS 170 in another subsystem, in a single, integrated terrestrial and non-terrestrial RAN. Furthermore, there may be multiple BSs 170 in multiple subsystems in the single, integrated terrestrial and non-terrestrial RAN. The switch of the connection may take into consideration the mobility of the UE 110, the location of the UE 110, the trajectory of the UE 110, the connection state of the UE 110 and power saving at the UE 110. These considerations allow the UE 110 in the RRC_CONNECTED state to be handed over from one subsystem to another subsystem or allow the UE 110 in the RRC_IDLE state or the RRC_INACTIVE state to switch from association with one subsystem to association with another subsystem. In both cases, efforts are taken to reduce physical layer control/data transmission interruption. In this way, the user experience may be maintained interruption-free and power saving may be realized.

According to some aspects of the present application, the NTN BS 170B may communicate directly with the TN BS 170A to enable a handover for a UE 110 in the RRC_CO- NNECTED state from a connection with the NTN BS 170B to a connection with the TN BS 170A. Similarly, the NTN BS 170B may communicate directly with the TN BS 170A to enable a transition of a UE 110 in the RRC_IDLE state or the RRC_INACTIVE state from an association with the NTN BS 170B to an association with the TN BS 170A. In addition, in the context wherein the UE 110 is maintaining more than one connection to different subsystems or BSs 170 of different subsystems, the UE 110 may maintain only one active connection at a time, the term "switch" may relate to changing the active connection from one connection to another connection among the multiple connections.

In LTE and NR, it is known for direct communication related to UE handover to take place between base stations over a so-called Xn interface. However, no such direct communication has yet been defined in current 3GPP NTN studies and work items. Indeed, there has yet been no definition of an Xn interface, or other wireless backhaul link, for direct communication between the TN BS 170A and the NTN BS 170B.

According to some aspects of the present application, a direct communication link 199 (see FIG. 1) may be established between the NTN BS 170B and the TN BS 170A, thereby enabling joint operation of the TN subsystem 120A and the NTN subsystem 120B.

The direct communication link 199 between the NTN BS 170B and the TN BS 170A may be shown to be more efficient than any of the communication links 190 between the NTN BS 170B and the UE 110. Accordingly, some aspects of the present application relate to use of the direct communication link 199 between the NTN BS 170B and the TN BS 170A to share configuration parameters useful for controlling a handover, or for controlling a switch, of a UE 110 between BSs 170. Example configuration parameters useful for a handover, from an existing connection with a BS 170 to a new connection with a distinct BS 170, include: beam direction; preamble assignment; common configuration parameters for the new connection; and UE-specific configuration parameters for the new connection. Such sharing of configuration parameters may be shown to lead to improved overall spectral efficiency and reduced power use for the two BSs 170 and the UE 110.

Further some aspects of the present application relate to the manner that configuration parameters may be signaled to the UE 110 and the nature of the configuration parameters. When the UE 110 is in RRC_INACTIVE mode or RRC_IDLE mode, the manner in which the configuration parameters may be signaled to the UE 110 may include so-called "common signaling." That is, the information is broadcast to all UEs 110 in range of the signaling. When the UE 110 is in the RRC_CONNECTED mode, the manner in which the configuration parameters may be signaled to the UE 110 may include so-called "dedicated signaling," that is, UE-specific signaling.

The configuration parameters may include timing advance (TA) information, Doppler shift, BS 170 position information and satellite ephemeris information. Satellites are known to transmit information about their location (current and predicted), timing and "health." This information is known as ephemeris data. Notably, such ephemeris data is not provided in relation to a conventional handover procedure in LTE or 5G NR. Indeed, ephemeris data is irrelevant in terrestrial networks, because the position of each BS 170 is fixed.

Further aspects of the present application relate to activation and deactivation of measurements relative to the other subsystem, for power saving purposes. For example, the UE 110 may perform mobility measurements with respect to only NTN base stations 170, may perform mobility measurements with respect to only TN base stations 170 or may perform mobility measurements with respect to both NTN base stations 170 and TN base stations 170.

A UE 110 with limited processing capability cannot be expected to monitor, all at once, radio links on, e.g., a cellular network, a wireless network based on drones, a wireless network based on planes and a wireless network based on satellites. It should be well understood that such extensive monitoring would cause the UE 110 to drain its battery.

According to some aspects of the present application, a given BS 170 can instruct the UE 110 to detect and measure only certain physical layer links by activating and deactivating mobility measurements on given mobility reference signals related to one of the subsystems.

The UE 110 may select, during a beam-based cell search in an initial access procedure, a serving airborne NTN BS 170 based on downlink (DL) RSRP measurements of a received Random Access Response (RAR) message.

An access point (e.g., the TN BS 170A) belonging to a second subsystem may receive feedback from one or multiple access points (e.g., the NTN BS 170B) belonging to a first subsystem. The feedback may relate to the quality of received uplink (UL) signals (e.g., preambles). The access point belonging to the second subsystem may select, on the basis of the received feedback, a serving node for the second subsystem and inform the UE 110 of the selection.

Still further aspects of the present application relate to the UE 110 sending multiple random access request (RAR) messages to several BSs 170. The UE 110 may be capable of handling, either directly or while employing help from a BS 170, a situation wherein multiple random access response messages are received. This is not the case in either LTE or 5G NR, wherein a certain BS 170 is targeted with random access attempts. The motivation for the multiple random access request messages is that a BS 170 having an optimum downlink towards the UE 110 may not necessarily be the best BS 170 to receive the random access response message, especially when beam-based access is used.

Consider NR multi-TRP handover from a source BS to a target BS. Here, the term "NR multi-TRP handover" is assumed to refer to beam-based NR handover. It is known that an NR multi-TRP handover involves a beam sweeping operation at the UE. That is, the UE restricts attempts to receive signals from the target BS to a narrow angular section centered around an angular direction and then repeats the attempt in a wide variety of angular directions. In contrast, some aspects of the present application promote using, at the UE 110, the information provided during the configuration. Of particular use to the UE 110 is the information about the position and trajectory/satellite ephemeris for a BS 170. Using such information, the UE 110 can directly steer preamble transmissions towards, that is, can direct a beam towards, a specific BS 170 without incurring the delay associated with the beam sweeping operation known in NR.

In some embodiments, a range of angular directions may be in the form of a set of quantized angular directions. The angular range may correspond to a certain region of space. In some embodiments, the angular range might only carry information in an absolute way about the upper bound and the lower bound of the angular directions to be used by the UE. Individual quantized angular directions within the indicated angular range may be determined by the UE, e.g., by uniformly distributing quantized angular directions in the angular range. As another example, a set of quantized angular directions may be explicitly indicated to the UE with the complete set of quantized angular directions corresponding to individual angular directions in an absolute way. This may represent a more complete representation of the region of space that the UE is indicated about because the lower bound of the angular direction, the upper bound of the angular direction, and the resolution of each angular direction is explicitly provided.

In some embodiments, beams refer to spatial filters. Spatial filters are signal processing techniques applied by devices such as a UE, a T-TRP, or an NT-TRP for the purpose of directional communication, e.g., so that the UE or the T-TRP or NT-TRP can transmit or receive physical layer signals or channels in a certain region of space. In some embodiments, directional communication refers to communication where beamforming is used by devices such as a UE, a T-TRP, or an NT-TRP. In wireless communications, such spatial filtering is used to, e.g., focus energy in a certain region of space. One example of spatial filtering in wireless communications is called digital precoding, where different physical layer signals carrying data streams are transmitted using multiple antennas and the different antennas use different digital phase shifts such that when the physical layer signals are transmitted over the air using the multiple antennas, the signal waves add up constructively in a certain region of space, e.g., where the UE is located. Another example of spatial filtering is analog beamforming where different physical layer signals are transmitted using multiple antennas and the different antennas use different analog phase shifts such that when the physical layer signals are transmitted over the air using the multiple antennas, the signal waves add up constructively in a certain region of space, e.g., where the UE is located. Another example of spatial filtering is hybrid beamforming, which uses a combination of both digital and analog beamforming to perform signal processing such that signal waves add up constructively in a certain region of space.

In NR, beam sweeping is carried out during initial access. The beam sweeping is based on a predefined codebook of angular directions that cover an entire angular space and are used by the BS to sequentially transmit SSBs. In a process called "beam determination," the UE 110 may select a "best" direction. Alternatively, beam determination may involve the UE 110 being informed, by the source BS, of a "best" direction. After beam determination, the UE 110 waits for the target BS to schedule a random access channel (RACH) transmission opportunity towards the best direction.

Notably, beam determination can be helped by the source BS in the case of contention-free handover, that is, the UE 110 does not have to determine the best beam towards the target BS by relying on SSB detection. This is because of an implicit association between SSBs and RACH opportunities. This process may require an additional complete directional sweep by the target BS, thus further increasing the time taken to complete the handover. Notably, LTE does not support beam-based initial access or beam-based handover.

It may be shown that network resilience, power saving and lower latency can be achieved through aggregating a secondary connection with a primary connection. Both the primary connection and the secondary connection can be activated simultaneously or one of the connections can be semi-statically/dynamically activated/deactivated.

Some aspects of the present application relate to exploiting the direct communication link 199 between the NTN BS 170B and the TN BS 170A (see FIG. 1) to, thereby, enable a UE 110 to efficiently switch from a connection with the TN BS 170A to a connection with the NTN BS 170B or vice versa under different scenarios. The procedures embodying some aspects of the present application stand in contrast to conventional solutions for inter/intra-RAN handover procedures.

FIG. 4 illustrates a scenario in which the TN BS 170A has a TN service area 400A (also known as a "cell"). FIG. 4 illustrates that a first non-terrestrial BS 170B-1 has a first NTN service area 400B-1, a second non-terrestrial BS 170B-2 has a second NTN service area 400B-2 and a third non-terrestrial BS 170B-3 has a third NTN service area 400B-3. An example UE 110 is illustrated in FIG. 4 as moving from the TN service area 400A to the first NTN service area 400B-1.

In 5G NR, a UE 110 may operate in one of the following three radio resource control (RRC) states: an RRC_IDLE state; an RRC_CONNECTED state; and an RRC_INACTIVE state. In other documentation, these states may be referenced as "modes", for example, "RRC_IDLE mode." When the UE 110 is in the RRC_CONNECTED state, the UE 110 may be considered to have been connected to a BS 170 as a result of a connection establishment procedure. When the UE 110 has transitioned to the RRC_IDLE state, say, by way of a release procedure, the UE 110 is not connected to the BS 170, but the BS 170 knows that the UE 110 is present in the network. By switching to the RRC_INACTIVE state, for example, by way of a release with suspend procedure, the UE 110 helps save network resources and UE power (thereby lengthening, for example, perceived battery life). The RRC_INACTIVE state is known to be useful, for example, in those instances when the UE is not communicating with the BS 170. When the UE is in the RRC_INACTIVE state, the BS 170 and the UE both store at least some configuration information to, thereby, allow the UE 110 to reconnect to the BS 170, by way of a resume procedure, more rapidly than the UE 110 would be able to reconnect, by way of the connection establishment procedure, in the case wherein the UE 110 is in the RRC_IDLE state. The storage of at least some configuration information when the UE 110 is in the RRC_INACTIVE state is one aspect that distinguishes the RRC_INACTIVE state from the RRC_IDLE state.

When the UE 110 in FIG. 4 is in the RRC_IDLE state or the RRC_INACTIVE state, the UE 110 may receive common configuration signaling from the TN BS 170A. For example, the common configuration signaling may be received, by the UE 110, using higher layer signaling, such as RRC signaling. In view of FIG. 4, the TN BS 170A may be understood to maintain a direct communications link 402-1 to the first NTN BS 170B-1, a direct communications link 402-2 to the second NTN BS 170B-2 and a direct communications link 402-3 to the third NTN BS 170B-3. Accordingly, in the network illustrated in FIG. 4, the TN BS 170A may broadcast common configuration signaling containing information specific to the three NTN base stations 170B.

Example configuration parameters included, by the TN BS 170A in the broadcast common configuration signaling, may include: common timing advance (TA) information; Doppler shift information; common RACH configuration information; NTN BS 170B position information; NTN BS 170B trajectory information; NTN BS 170B satellite ephemeris information; and DL timing synchronization information.

Figure 5:
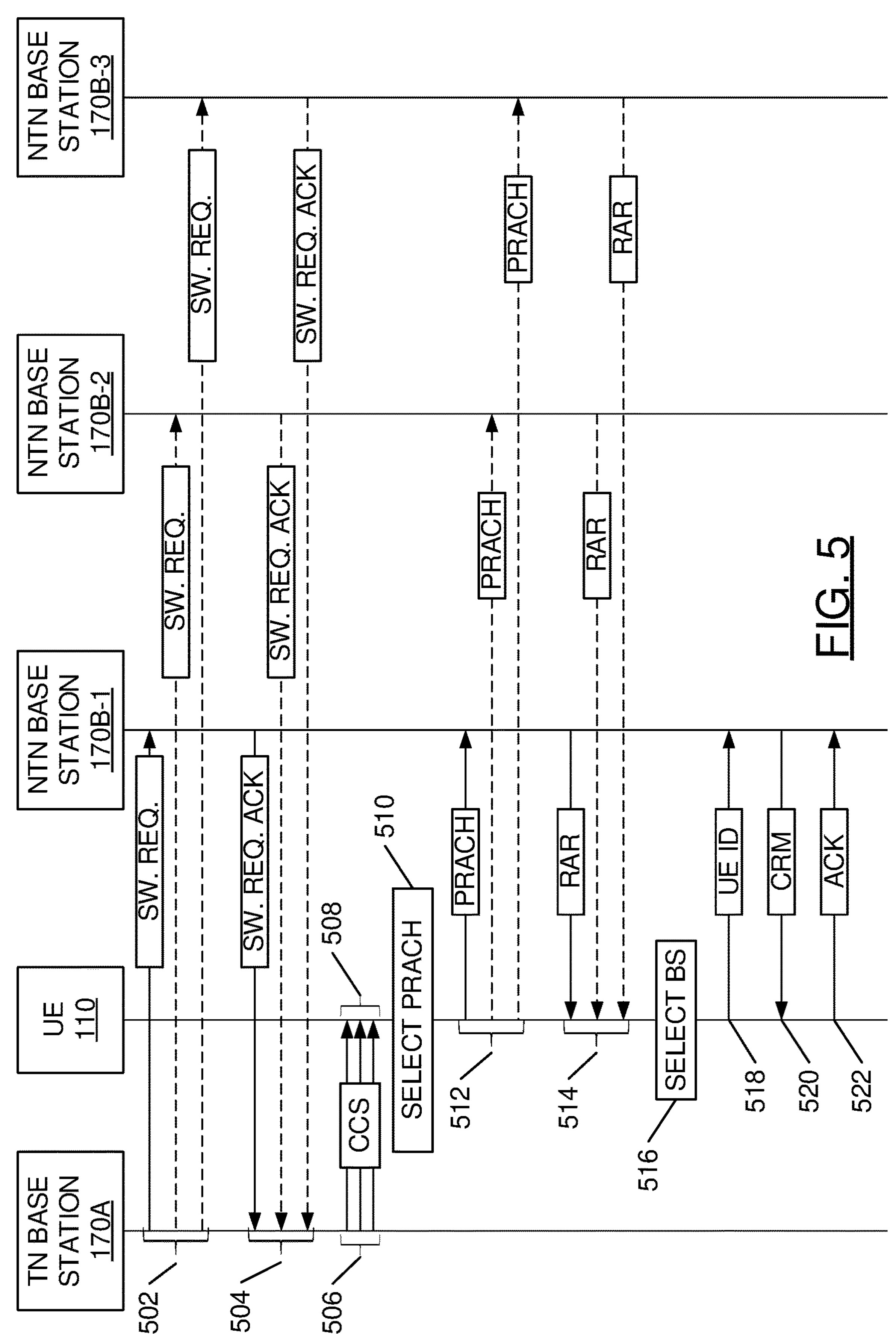
FIG. 5 illustrates, in a signal flow diagram, communication exchange between the example user equipment, the terrestrial network base station and the multiple non-terrestrial network base stations of FIG. 4 with the pre-condition that the user equipment is in the RRC_IDLE state or the RRC_INACTIVE state, according to aspects of the present disclosure.

FIG. 5 illustrates, in a signal flow diagram, communication exchange between the UE 110, the TN BS 170A and the three NTN base stations 170B of FIG. 4 with the precondition that the UE 110 is in the RRC_IDLE state or the RRC_INACTIVE state.

Initially, the TN BS 170A transmits (step 502) to one or more NTN base stations 170B, a SwitchRequest message indicating that the UE 110 is going to switch to the NTN subsystem. The TN BS 170A then receives (step 504), from the one or more NTN base stations 170B, a SwitchRequest-Acknowledge message.

Subsequently, the TN BS 170A broadcasts (step 506) common configuration signaling carrying details for the three NTN base stations 170B. The UE 110 receives (step 508) the common configuration signaling and may store the information contained therein in the UE memory 208. The UE 110 may then select (step 510) a RACH preamble, that is, a preamble for transmission over a physical random access channel (a "PRACH"). The UE 110 may then transmit (step 512) the preamble to each of the three NTN base stations 170B. In particular, when transmitting (step 512) a beam carrying the preamble in the direction of a particular one of the NTN base stations 170B, the UE 110 may use a rough TA adjustment and a Doppler compensation based on the common TA information and Doppler shift information specific to the particular one of the NTN base stations 170B included in the common configuration signaling specific to the particular one of the NTN base stations 170B. Notably, the number of NTN base stations 170B to which the UE 110 transmits (step 512) the preamble is optional.

In response to the transmission (step 512) of the preamble over the PRACH, the UE 110 may receive (step 514) an RAR message from each of the NTN base stations 170B to which the preamble was transmitted. Each RAR message is expected to contain fine-tuned timing advance information and Doppler shift corrections corresponding to the NTN base stations 170B from which the RAR message is received.

The UE 110 then selects (step 516) one of the NTN base stations 170B from which an RAR message has been received. The selecting (step 516) may be based on comparing a DL RSRP measurement of the RAR-carrying signal from each of the NTN base stations 170B from which an RAR message has been received. Upon selecting (step 516) a particular NTN BS 170B, the UE 110 transmits (step 518), on a physical uplink shared channel (PUSCH), a UE identifier (ID) to the particular NTN BS 170B. The UE ID may, for one example, be implemented as a Cell Radio Network Temporary Identifier (C-RNTI). The UE identifier may, for another example, be implemented as a core network ID. When transmitting (step 518) the UE ID on the PUSCH, the UE 110 may use resources specified in the corresponding RAR message. Additionally, when transmitting (step 518) the UE ID on the PUSCH, the UE 110 may adjust the TA according to the fine tuning information in the corresponding RAR message.

The selected NTN BS 170B that receives the UE ID may respond with a contention resolution message. The selected NTN BS 170B may base aspects of the contention resolution message on the received UE ID.

In the case wherein the UE 110 has indicated the UE ID as a C-RNTI, the selected NTN BS 170B may transmit the contention resolution message using a physical downlink control channel (PDCCH) while specifying the C-RNTI.

In the case wherein the UE 110 has not indicated the UE ID as a C-RNTI, perhaps because the UE 110 does not have a valid C-RNTI, the selected NTN BS 170B may transmit the contention resolution message using a physical downlink control channel (PDCCH) while specifying a temporary C-RNTI (i.e., a "TC-RNTI"). Indeed, a TC-RNTI may have been proposed to the UE 110, by the selected NTN BS 170B, in the RAR message. The selected NTN BS 170B may transmit the contention resolution message over a physical downlink shared channel (PDSCH) associated with the PDCCH.

The UE 110 receives (step 520) the contention resolution message and extracts an indication of a UE ID. The UE 110 then compares the extracted UE ID to the UE ID transmitted in step 518. Upon determining that the extracted UE ID from the contention resolution message received in step 520 matches the UE ID transmitted in step 518, the UE may declare the contention resolution successful and transmit (step 522) an acknowledgement to the selected NTN BS 170B.

Use of the signal flow illustrated in FIG. 5 may be shown to result in smooth subsystem mobility for UEs 110 in the RRC_IDLE state or the RRC_INACTIVE state. Such UEs 110 can be transferred, in this way, from one subsystem to another subsystem in an apparently seamless manner, wherein the user experience appears interruption-free. Subsequent to the transfer, the UE 110 may remain in the RRC_IDLE state or the RRC_INACTIVE state. Alternatively, the UE 110 may perform a well-known initial access procedure to transition to the RRC_CONNECTED state.

Conveniently, the subsystem mobility is controlled by the TN BS 170A. The TN BS 170A determines which NTN BS 170B the UE 110 is potentially handed over to. Accordingly, the UE 110 need not waste time and/or processing power detecting radio links and measuring the detected radio links from subsystems on which the UE 110 has not been activated or configured to detect NTN radio links and SSBs, or carry out measurements with respect to NTN reference signals.

Foregoing aspects of the present application may approach mobility management in integrated TN and NTN networks by providing a framework wherein the TN BS 170A can facilitate transferring a UE 110 that is in the RRC_IDLE state or the RRC_INACTIVE state from TN to NTN, while reducing switching delays. Beam sweeping efforts in beam-based communications are also reduced, because the UE 110 does not have to detect SSBs from all of the NTN BSs 170B in the NTN subsystem. Indeed, the UE 110 can rely on information broadcast by the TN BS 170A to directly beamform preamble transmissions (step 512) in the direction of a certain subset of NTN BSs 170B.

Figure 6:
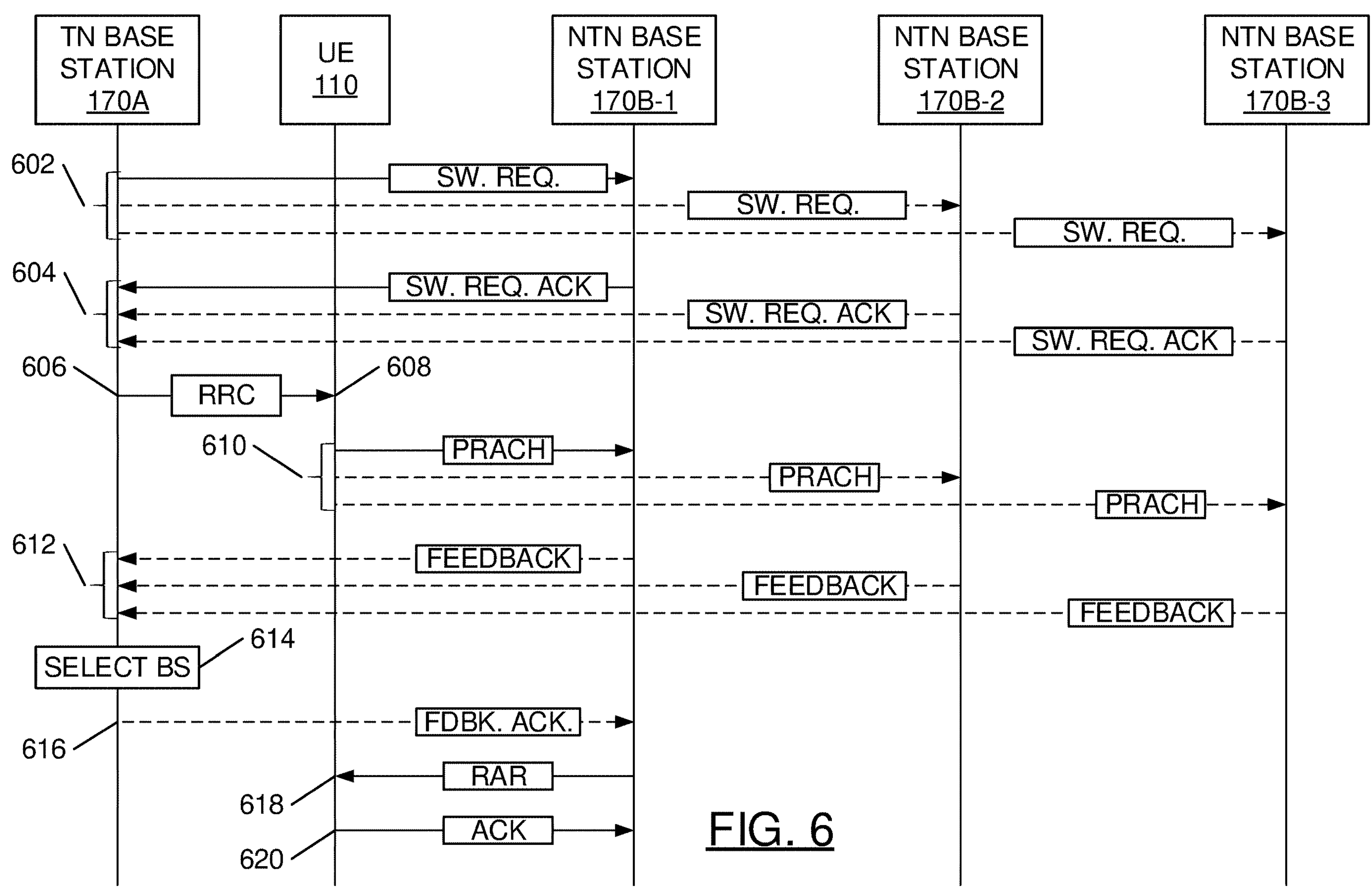
FIG. 6 illustrates, in a signal flow diagram, communication exchange between the example user equipment, the terrestrial network base station and the multiple non-terrestrial network base stations of FIG. 4 with the pre-condition that the user equipment is in the RRC_CONNECTED state, according to aspects of the present disclosure.

In contrast to steps (see FIG. 5) taken when the UE 110 is in the RRC_IDLE state or the RRC_INACTIVE state, FIG. 6 illustrates, in a signal flow diagram, communication exchange between the UE 110, the TN BS 170A and the three NTN base stations 170B of FIG. 4 with the precondition that the UE 110 is in the RRC_CONNECTED state.

Because the UE 110 is in the RRC_CONNECTED state with respect to the TN BS 170A, it may be assumed that the UE 110 has performed an initial access procedure. As part of the initial access procedure, it is expected that the UE 110 received initial configuration parameters from the TN BS 170A regarding mobility measurements. The UE 110 can use the initial configuration parameters when detecting and measuring mobility reference signals from other TN BSs 170A.

The initial configuration parameters can be provided, by the TN BS 170A, to the UE 110 using, e.g., higher-layer signaling. The signaling may be in the form of resource sets and resources provided for each subsystem. That is, resource sets and resources may be provided for the TN subsystem 120A and resource sets and resources may be provided for the NTN subsystem 120B.

Each configuration of resources to be used for mobility measurements can carry information such as resource identity, time/frequency location, measurement periodicity, sequence generation, etc. Subsystem information, e.g., subsystem type (terrestrial, non-terrestrial) and subsystem identity, can be provided per resource or per resource set. Alternatively, resources and resource sets can be configured specifically per subsystem. An example 700 of a mobility resource configuration provided by higher-layer signaling is given in FIG. 7.

FIG. 6 illustrates, in a signal flow diagram, communication exchange between the UE 110, the TN BS 170A and the three NTN base stations 170B of FIG. 4 with the pre-condition that the UE 110 is in the RRC_CONNECTED state.

Initially, the TN BS 170A transmits (step 602), to one or more NTN base stations 170B, a SwitchRequest message indicating that the UE 110 is going to switch to the NTN subsystem. The TN BS 170A then receives (step 604), from the one or more NTN base stations 170B, a SwitchRequest-Acknowledge message.

Subsequently, the TN BS 170A transmits (step 606), to the UE 110, device-specific RRC signaling, such as an RRCReconfiguration message. The device-specific RRC signaling may include configuration parameters, such as a fine TA adjustment indication, a Doppler shift indication, a dedicated RACH configuration Information Element (IE), a trajectory or some satellite ephemeris for the NTN BSs 170B and a New C-RNTI. The UE 110 receives (step 608) the device-specific RRC signaling and may store the information contained therein in the UE memory 208.

The UE 110 may then transmit (step 610) a preamble to each of the three NTN base stations 170B. In particular, when transmitting (step 610) a beam carrying the preamble in the direction of a particular one of the NTN base stations 170B, the UE 110 may use the fine TA adjustment indication and the Doppler shift indication specific to the particular one of the NTN base stations 170B that was included in the device-specific RRC signaling. In contrast to the case illustrated in FIG. 5, corresponding to the UE 110 being in in the RRC_IDLE state or the RRC_INACTIVE state, rather than the UE 110 selecting (step 510) a preamble, the UE 110 receives the preamble, from the TN BS 170A, in the device-specific RRC signaling received in step 608. In common with the case illustrated in FIG. 5, the number of NTN base stations 170B to which the UE 110 transmits (step 610) the preamble is optional.

The UE 110 may calculate a distinct Radio Network Temporary Identifier ("UE_RA_RNTI") based on the time of transmitting (step 610) each preamble. Additionally, each NTN BS 170B calculates a distinct Radio Network Temporary Identifier ("gNB_RA_RNTI") based on the time of receiving the preamble over the PRACH.

In response to receiving the preamble transmission (step 610), each of the NTN base stations 170B optionally transmits a feedback signal to the TN BS 170A. The TN BS 170A subsequently receives (step 612) the feedback signal from each of the NTN base stations 170B that has transmitted a feedback signal. The feedback signal includes an indication of a measurement of signal quality for the preamble received, from the UE 110, by each NTN BS 170B.

The TN BS 170A then selects (step 614) one of the NTN base stations 170B. The selecting (step 614) may be based on comparing the measurement of preamble signal quality received, in the feedback signal, from each of the NTN base stations 170B for which a feedback signal has been received. Upon selecting (step 614) a particular NTN BS 170B, the TN BS 170A transmits (step 616) an indication, to the particular NTN BS 170B, where the indication specifies that the particular NTN BS 170B has been selected.

Responsive to receiving the indication, the particular NTN BS 170B transmits an RAR message to the UE 110. Upon receiving (step 618) the RAR message, the UE 110 decodes the RAR message using an RA_RNTI value. The UE 110 may determine the RA_RNTI value by determining a difference between the UE value and the BS value, i.e., RA_RNTI=UE_RA_RNTI−gNB_RA_RNTI. The UE 110 may then transmit (step 620) an acknowledgement to the selected NTN BS 170B. The acknowledgement may take the form of a RRCReconfigurationComplete message.

Use of the signal flow illustrated in FIG. 6 may be shown to result in smooth subsystem mobility for UEs 110 in the RRC_CONNECTED state. Such UEs 110 can be transferred, in this way, from one subsystem to another subsystem in an apparently seamless manner, wherein the user experience appears interruption-free.

Conveniently, the subsystem mobility is controlled by the TN BS 170A. The TN BS 170A controls to which NTN BS 170B the UE 110 is potentially handed over. Accordingly, the UE 110 need not waste time and/or processing power detecting radio links and measuring the detected radio links from subsystems.

Foregoing aspects of the present application may approach mobility management in integrated TN and NTN networks by providing a framework wherein the TN BS 170A can facilitate transferring a UE 110 that is in the RRC_CONNECTED state from TN to NTN, while reducing handover delays. Beam sweeping efforts in beam-based communications are also reduced, because the UE 110 does not have to detect SSBs from NTN BSs 170B. Indeed, the UE 110 can rely on information broadcast by the TN BS 170A to directly beamform preamble transmissions (step 610) in the direction of a certain subset of NTN BSs 170B.

Figure 8:
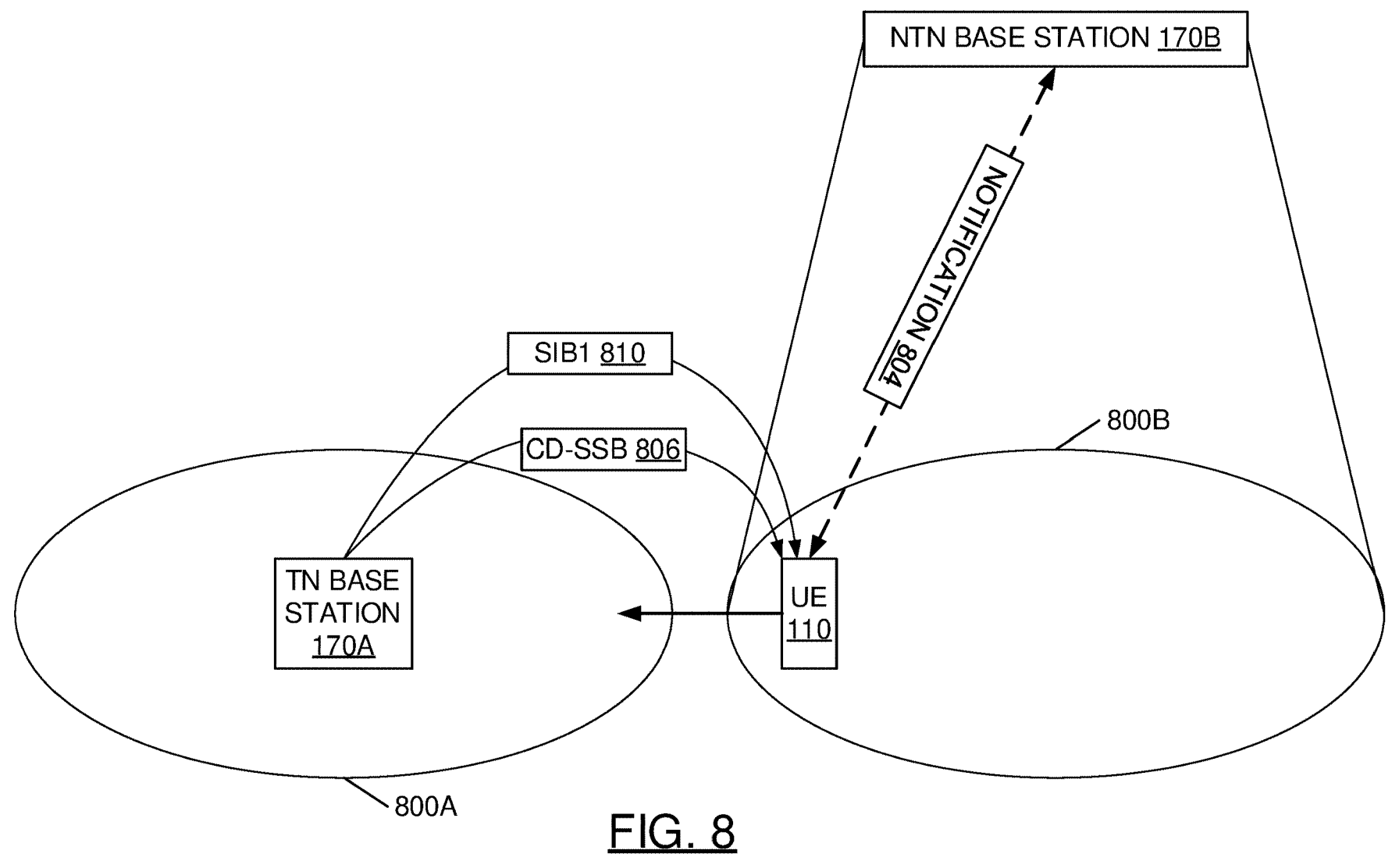

FIG. 8 illustrates a scenario in which the TN BS 170A has a TN service area 800A. FIG. 8 illustrates that a NTN BS 170B has a NTN service area 800B. An example UE 110 is illustrated in FIG. 8 as moving from the NTN service area 800B to the TN service area 800A.

Figure 9:
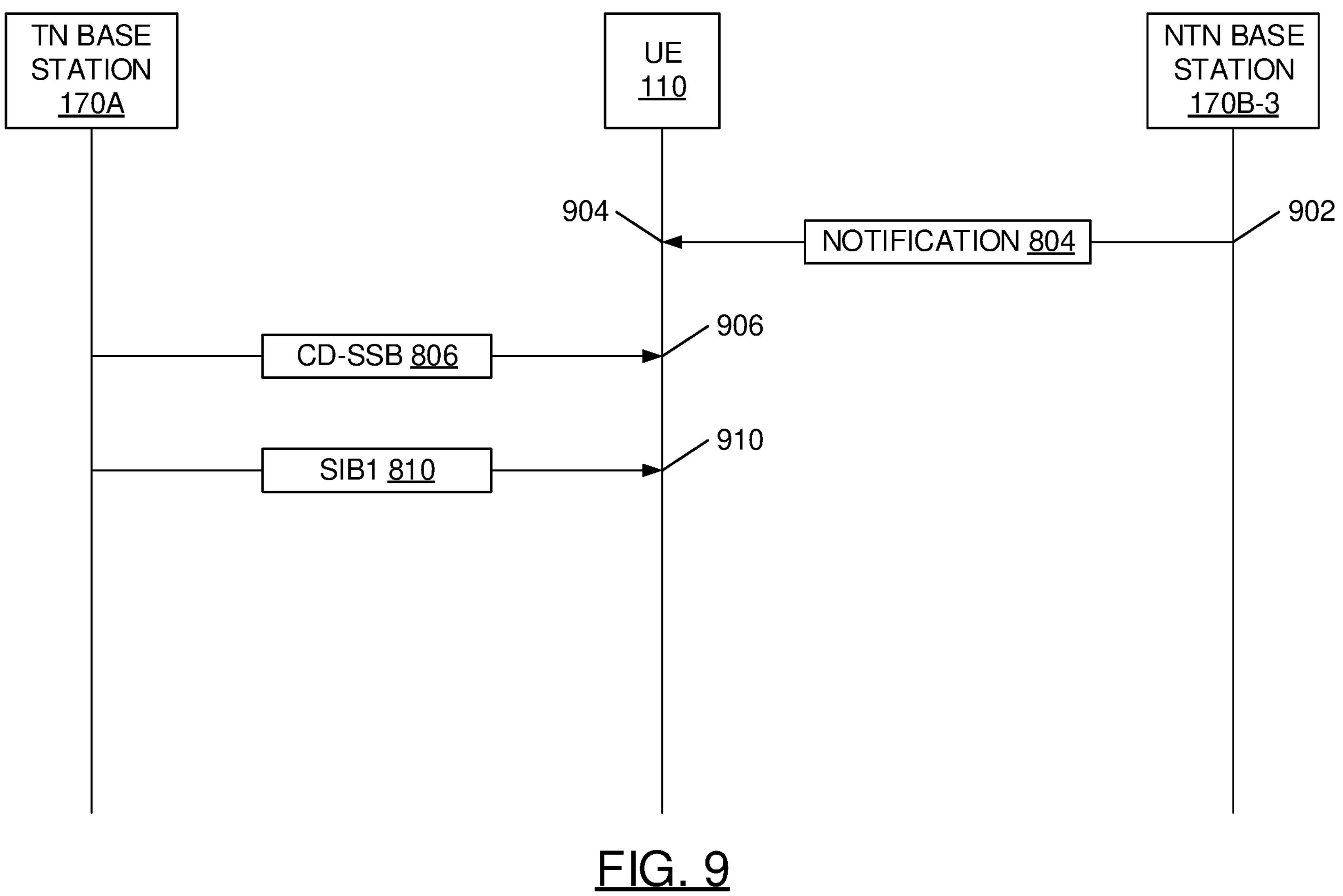
FIG. 9 illustrates, in a signal flow diagram, communication exchange between the example user equipment, the terrestrial network base station and the multiple non-terrestrial network base stations of FIG. 8 with the pre-condition that the user equipment is in the RRC_IDLE state or the RRC_INACTIVE state, according to aspects of the present disclosure.

FIG. 9 illustrates, in a signal flow diagram, communication exchange between the UE 110, the TN BS 170A and the NTN BS 170B of FIG. 8 with the pre-condition that the UE 110 is in the RRC_IDLE state or the RRC_INACTIVE state.

In the cases wherein the UE 110 is in the RRC_IDLE state or in the RRC_INACTIVE state, the NTN BS 170B transmits (step 902), to the UE 110, a notification 804. The notification 804 is designed to inform the UE 110 that the UE 110 is about to enter the TN service area 800A of the TN BS 170A. The notification 804 may be transmitted (step 902) in the form of a paging message. The receipt of the notification 804 (in the paging message) may be preceded by receipt of a PDCCH (not shown) scrambled with a common paging identifier. The common paging identifier may, for example, take the form of a paging radio network temporary identifier (P-RNTI). The PDCCH may provide scheduling information for a PDSCH carrying the notification 804 (in the paging message).

Upon receiving (step 904) the notification 804, the UE 110 may respond to the notification 804 by activating a cell reselection or initial cell selection procedure. Such a cell reselection or initial cell selection procedure may include performing measurements on signals received from various TN BSs 170 that define candidate TN cells (TN service areas).

Recall that, in LTE, the frequency domain position of a Primary Synchronization Signal (PSS) and a Secondary Synchronization Signal (SSS) is fixed around carrier center frequency. In 5G NR, based on the frequency band, a set of possible frequency locations for SSBs are defined and this set is called a synchronization raster. The UE 110 may limit a search for SSBs to the plurality of frequencies in this raster.

The UE 110 may receive (step 906) a TN cell-defining SSB (CD-SSB) 806 associated with the TN service area 800A that includes the TN BS 170A. The frequency on which the CD-SSB 806 is received by the UE 110 is understood to be among a plurality of frequencies in a TN synchronization raster maintained by the UE 110. The UE 110 may determine that the CD-SSB 806 has a RSRP that is larger, by a predefined threshold, than the RSRP of a current NTN CD-SSB (not shown) received from the NTN BS 170B.

Furthermore, the UE may receive (step 910), from the TN BS 170A, a system information message 810. The system information message 810 may be implemented as a TN system information block (SIB1). Notably, the TN BS 170A broadcasts the SIB or SIB1 810 to all UEs 110 in the TN service area 800A. The received TN SIB1 810 includes cell access related information and, in particular, Public Land Mobile Network (PLMN) information. PLMN information is known to include a tracking area code parameter, a RAN area code parameter and a Cell Identity parameter. The tracking area code parameter indicates a specific tracking area code to which the cell indicated by cell identity parameter belongs. The RAN area code parameter is used to identify a RAN area within the scope of a Tracking Area. The cell identity parameter is used to identify a cell within a PLMN.

The receipt of the TN SIB1 810 may be preceded by receipt of a PDCCH scrambled with a common system information identifier. The PDCCH may provide scheduling information for a PDSCH carrying the TN SIB1 810. The common system information identifier may be a system information radio network temporary identifier (SI-RNTI).

Because, in the context of FIG. 9, the UE 110 is in the RRC_IDLE state or in the RRC_INACTIVE state, the interaction may end, temporarily, with the receiving (step 910) of the TN SIB1 810. The UE 110 may, in future, transition into the RRC_CONNECTED state by negotiating a connection with the TN BS 120A using a well-known connection establishment procedure.

Figure 10:
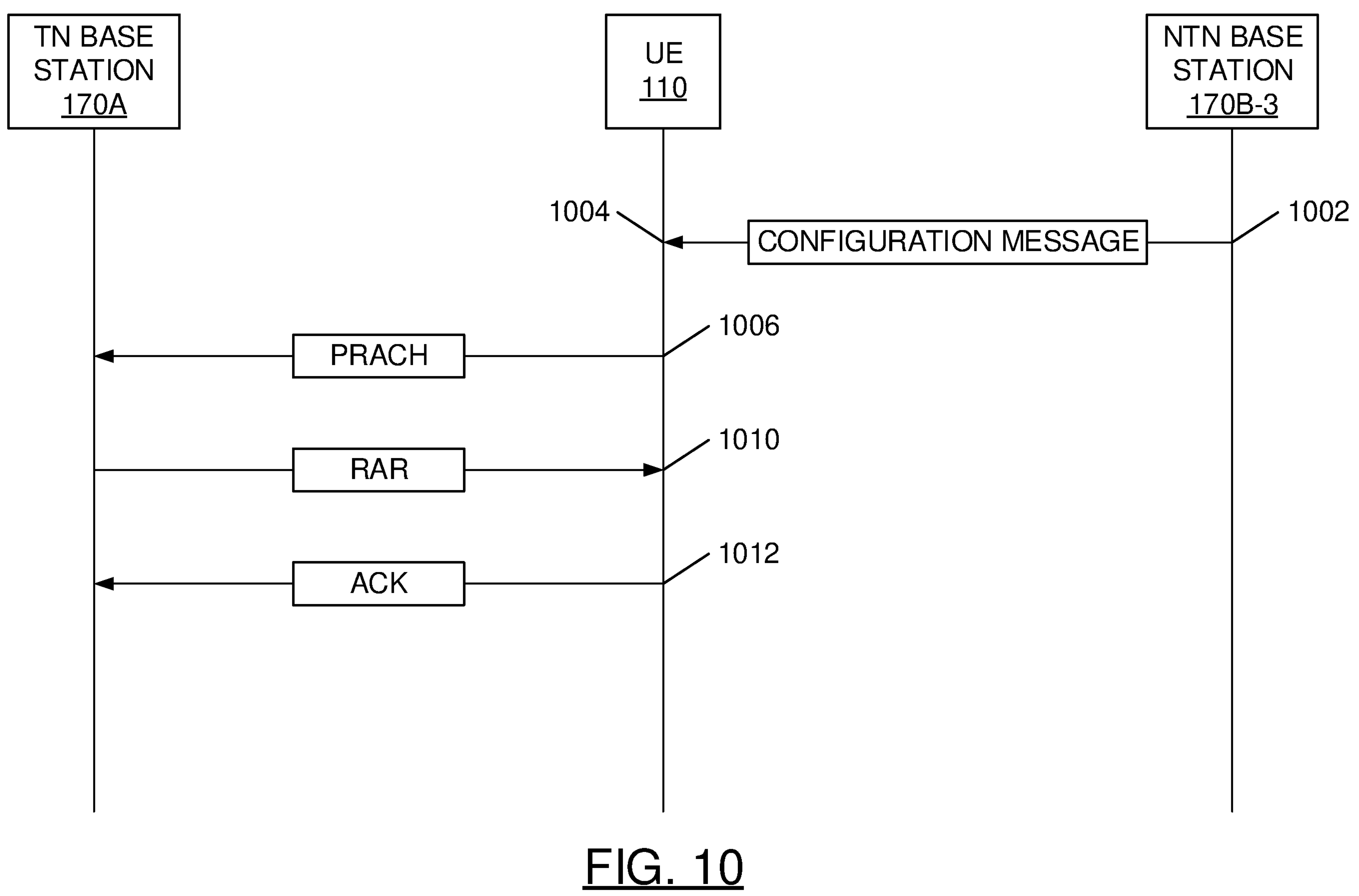
FIG. 10 illustrates, in a signal flow diagram, communication exchange between the example user equipment, the terrestrial network base station and the non-terrestrial network base station of FIG. 8 with the pre-condition that the user equipment is in the RRC_CONNECTED state, according to aspects of the present disclosure.

FIG. 10 illustrates, in a signal flow diagram, communication exchange between the UE 110, the TN BS 170A and the NTN base station 170B of FIG. 8 with the pre-condition that the UE 110 is in the RRC_CONNECTED state.

In the cases wherein the UE 110 is in the RRC_CONNECTED state, the NTN BS 170B transmits (step 1002) a configuration message the UE 110. The configuration message may indicate intra-frequency measurements and inter-frequency measurements for the UE 110 to perform with respect to TN mobility. Upon receiving (step 1004) the configuration message, the UE 110 may be caused to perform mobility measurements of SSBs and CSI-RSs.

To save power at the UE 110, the NTN BS 170B may delay activating the performance of mobility measurements at the UE 110 until the UE 110 moves relatively close to the edge of the NTN coverage area 800B. The configuration message may include an assignment of a dedicated preamble (i.e., a preamble for transmission over a dedicated PRACH) to the UE 110. Accordingly, the UE 110 may transmit (step 1006) the dedicated preamble to initiate a contention-free handoff in a manner similar to the procedure described in conjunction with the signal flow diagram illustrated in FIG. 6.

Responsive to receiving the preamble, the TN BS 170A transmits an RAR message to the UE 110. Upon receiving (step 1010) the RAR message, the UE 110 decodes the RAR message. The UE 110 may then transmit (step 1012) an acknowledgement to the TN BS 170A.

Use of the signal flow illustrated in FIG. 10 may be shown to result in smooth subsystem mobility for UEs 110 in the RRC_CONNECTED state. Such UEs 110 can be transferred, in this way, from one subsystem to another subsystem in an apparently seamless manner, wherein the user experience appears interruption-free.

Conveniently, the subsystem mobility is controlled by the NTN BS 170B. The NTN BS 170B controls to which TN BS 170A the UE 110 is potentially handed over. Accordingly, the UE 110 need not waste time and/or processing power detecting radio links and measuring the detected radio links from subsystems.

Foregoing aspects of the present application may approach mobility management in integrated TN and NTN networks by providing a framework wherein the NTN BS 170B can facilitate transferring a UE 110 that is in the RRC_CONNECTED state from NTN to TN, while reducing handover delays. Beam sweeping efforts in beam-based communications are also reduced, because the UE 110 does not have to detect SSBs from TN BSs 170A. Indeed, the UE 110 can rely on information received (step 1004) from the NTN BS 170B to directly beamform preamble transmissions (step 1006) in the direction of the TN BS 170A.

Figure 11:
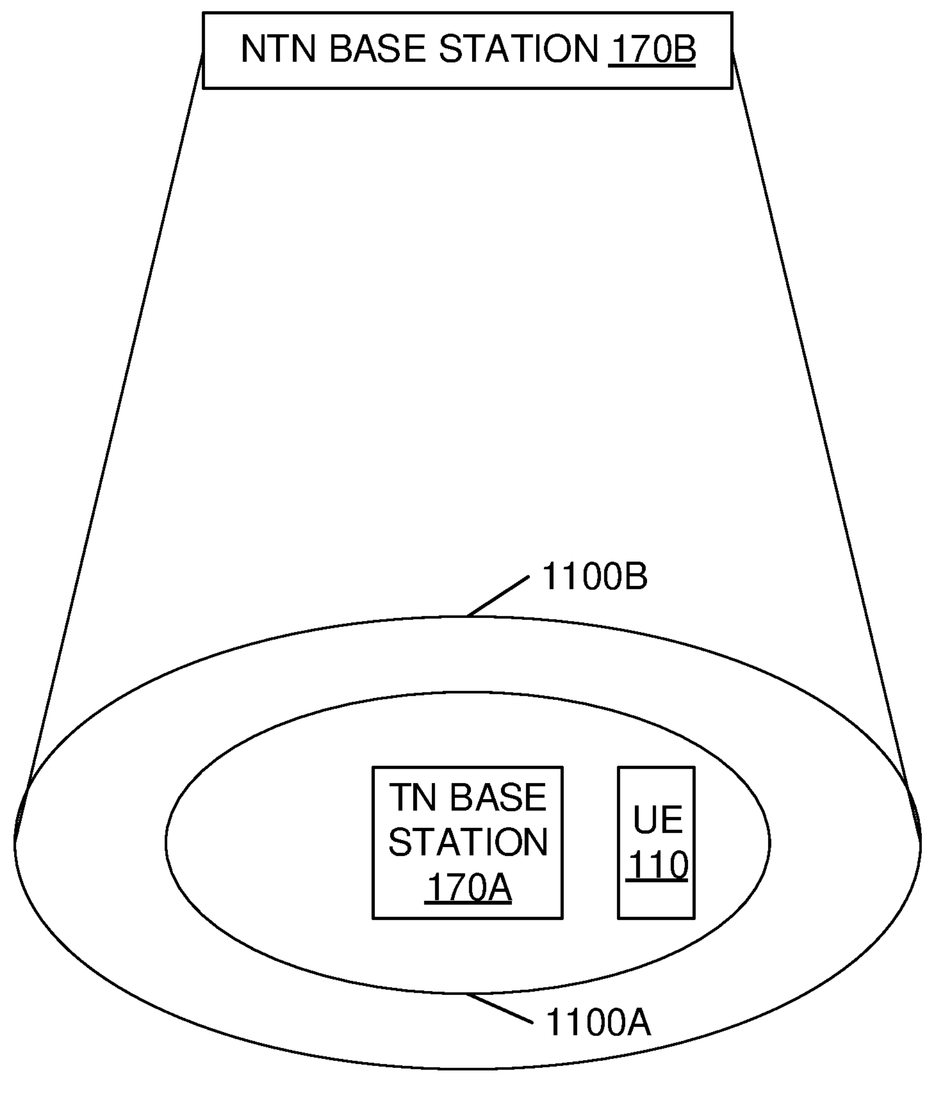
FIG. 11 illustrates an environment with a terrestrial network base station defining terrestrial network coverage and a non-terrestrial network base station defining non-terrestrial network coverage, with the example user equipment of FIG. 2 present in the non-terrestrial network coverage and present in the terrestrial network coverage, according to aspects of the present disclosure.

FIG. 11 illustrates a scenario in which the TN BS 170A has a TN service area 1100A. FIG. 11 illustrates that a NTN BS 170B has a NTN service area 1100B. An example UE 110 is illustrated in FIG. 8 as present in the NTN service area 800B and in the TN service area 800A.

Because the UE 110 is present in the NTN service area 800B and in the TN service area 800A, various functions, such as cell search functions and initial access functions may be shared between the TN and the NTN. Even when the TN service area 1100A and the NTN service area 1100B do not overlap (not shown), some functions can be shared. For example, the UE 110 only needs to perform initial access and registration in one connection. Additionally, some measurements information can be shared between connections.

Figure 12:
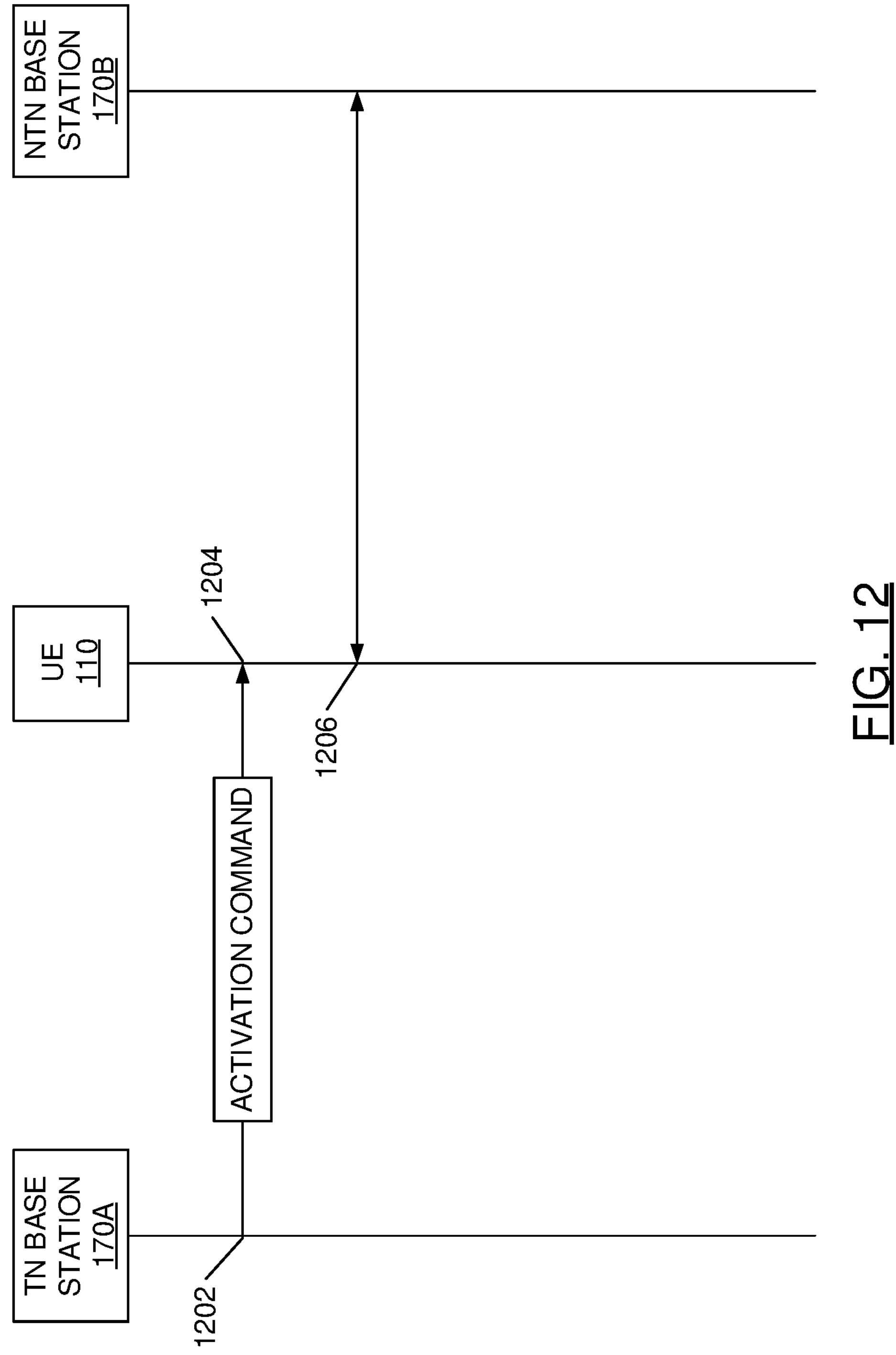
FIG. 12 illustrates, in a signal flow diagram, communication exchange between the example user equipment, the terrestrial network base station and the non-terrestrial network base station of FIG. 11, according to aspects of the present disclosure.

FIG. 12 illustrates, in a signal flow diagram, communication exchange between the UE 110, the TN BS 170A and the three NTN base stations 170B of FIG. 11. In the scenario illustrated in FIG. 11, the UE 110 may be considered to already maintain some connection to the terrestrial subsystem 120A and to the non-terrestrial subsystem 120B. However, the connection state of the UE 110 with respect to each subsystem is undefined. Indeed, there is incentive, here, to define a new RRC connection state for use in future integrated networks.

The UE 110 can activate an existing connection to the NTN BS 170B on the basis of a command received from the TN BS 170A. The TN BS 170A may transmit (step 1202) an activation command to the UE 110. In one example, the activation command may be received (step 1204) in the form of RRC signaling specific to the UE 110. In other examples, the activation command may be received (step 1204) in the form of a MAC CE command in a PDSCH or via downlink control information (DCI) in a PDCCH. Upon receiving (step 1204) the activation command, the UE 110 may communicate (step 1206) with the NTN BS 170B over an activated connection. The activation command provides the benefit of speeding up the UE 110 obtaining access to the non-terrestrial subsystem 120B and saves power at the UE 110.

The UE 110 can be dynamically switched between maintaining an active connection with the TN BS 170A and maintaining an active connection with the NTN BS 170B depending on RSRP measurements. In some aspects of the present application, maintaining an active connection to the TN BS 170A may be prioritized by the UE 110. This prioritization may be accomplished by imposing a RSRP threshold bias to favor the UE 110 connection with the TN BS 170A. The UE 110 may be switched from the TN BS 170A to the NTN BS 170B by the TN BS 170A according to some criteria, such as load balancing, power saving, etc.

Use of the signal flow illustrated in FIG. 12 may be shown to result in smooth subsystem mobility for UEs 110 in the RRC_IDLE state, the RRC_INACTIVE state or the RRC-_CONNECTED state. Such UEs 110 can be transferred, in this way, from one subsystem to another subsystem in an apparently seamless manner, wherein the user experience appears interruption-free.

Conveniently, the subsystem mobility is controlled by the NTN BS 170B. The NTN BS 170B controls to which TN BS 170A the UE 110 is potentially handed over. Accordingly, the UE 110 need not waste time and/or processing power detecting radio links from subsystems and measuring the detected radio links.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of managing user equipment mobility in a radio access network, the method comprising:

communicating, from a first device, a message to a second device, wherein one of the first device and the second device is a non-terrestrial device and the other of the first device and the second device is a terrestrial device; and providing, to a user equipment, configuration parameters related to access, by the user equipment, to the second device, the configuration parameters being distinct from a handover command.

2. The method of claim 1, further comprising receiving an acknowledgement of the message.

3. The method of claim 1, wherein the providing comprises broadcasting common configuration signaling.

4. The method of claim 3, wherein the user equipment is in an RRC_IDLE state or an RRC_INACTIVE state.

5. The method of claim 4, wherein the configuration parameters include one or more of common timing advance information, Doppler shift information, random access channel configuration information, position information for the second device, satellite ephemeris information, and satellite trajectory information.

6. The method of claim 1, wherein the providing comprises transmitting radio resource control signaling that is specific to the user equipment.

7. The method of claim 6, wherein the user equipment is in an RRC_CONNECTED state.

8. The method of claim 7, wherein the configuration parameters include one or more of fine timing advance information, Doppler shift information, random access channel configuration information, preamble information specific to the user equipment, satellite ephemeris information, and satellite trajectory information.

9. The method of claim 7, further comprising providing, to the user equipment, a Cell Radio Network Temporary Identifier.

10. The method of claim 1, further comprising receiving, from the second device, feedback based on a signal received, at the second device, from the user equipment.

11. The method of claim 10, further comprising:

receiving, from a further device, feedback based on a signal received, at the further device, from the user equipment;

selecting, from among the second device and the further device, and based on the feedback, a selected device; and transmitting, to the selected device, an indication specifying that the selected device has been selected.

12. A first device in a radio access network, the first device comprising:

a memory storing instructions; and a processor configured, by executing the instructions, to:

communicate a message to a second device, wherein one of the first device and the second device is a non-terrestrial device and the other of the first device and the second device is a terrestrial device; and provide, to a user equipment, configuration parameters related to access, by the user equipment, to the second device, the configuration parameters being distinct from a handover command.

13. A method for a user equipment in a radio access network, the method comprising:

receiving, from a first device, a notification, the notification activating, at the user equipment, a cell reselection or initial cell selection procedure for transitioning between a terrestrial device and a non-terrestrial device;

detecting, during the cell reselection or initial cell selection procedure, a cell-defining synchronization signal block from a second device, wherein one of the first device and the second device is the non-terrestrial device and the other of the first device and the second device is the terrestrial device; and receiving, from the second device, a system information message including initial access configuration parameters related to access, by the user equipment, to the second device.

14. The method of claim 13, wherein the receiving the system information message comprises receiving a physical downlink control channel scrambled with a common system information identifier scheduling a physical downlink shared channel carrying a system information block.

15. The method of claim 14, wherein the common system information identifier is a system information radio network temporary identifier.

16. The method of claim 13, wherein the receiving the notification comprises receiving a paging message.

17. The method of claim 16, wherein receiving the paging message comprises receiving a physical downlink control channel scrambled with a common paging identifier scheduling a physical downlink shared channel carrying the notification.

18. The method of claim 17, wherein the common paging identifier comprises a paging radio network temporary identifier.

19. The method of claim 14, wherein the system information block includes one or more of information about tracking, and information about radio access network areas.

20. The method of claim 13, further comprising, responsive to receiving the notification, activating measurements on a candidate cell defined by the second device.

21. The method of claim 13, further comprising receiving an assignment of a dedicated preamble.

22. The method of claim 21, further comprising initiating a contention-free random access procedure to the second device using the dedicated preamble.

23. The method of claim 22, wherein the notification includes one or more of an indication of a beam direction for transmitting the dedicated preamble to the second device, an indication of common configuration parameters for initiating a contention-based random access procedure to the second device, and an indication of user-equipment-specific configuration parameters for initiating a random access procedure to the second device.

24. A user equipment in a radio access network, the user equipment comprising:

a memory storing instructions;

a processor configured, by executing the instructions, to:

receive, from a first device, a notification, the notification activating, at the user equipment, a cell reselection or initial cell selection procedure for transitioning between a terrestrial device and a non-terrestrial device;

detect, during the cell reselection or initial cell selection procedure, a cell-defining synchronization signal block from a second device, wherein one of the first device and the second device is the non-terrestrial device and the other of the first device and the second device is the terrestrial device; and receive, from the second device, a system information message including initial access configuration parameters related to access, by the user equipment, to the second device.

* * * * *